US012358761B2

(12) United States Patent
Takaki et al.

(10) Patent No.: US 12,358,761 B2
(45) Date of Patent: Jul. 15, 2025

(54) CARGO CRANE, CARGO-CRANE SWING PREVENTION METHOD, AND CARGO CONVEYANCE METHOD

(71) Applicant: JFE STEEL CORPORATION, Tokyo (JP)

(72) Inventors: Yuki Takaki, Tokyo (JP); Yusuke Yoshinari, Tokyo (JP); Osamu Yamaguchi, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 289 days.

(21) Appl. No.: 18/010,136

(22) PCT Filed: May 14, 2021

(86) PCT No.: PCT/JP2021/018337

§ 371 (c)(1),
(2) Date: Dec. 13, 2022

(87) PCT Pub. No.: WO2021/261108

PCT Pub. Date: Dec. 30, 2021

(65) Prior Publication Data

US 2023/0234812 A1 Jul. 27, 2023

(30) Foreign Application Priority Data

Jun. 22, 2020 (JP) ................................ 2020-106741

(51) Int. Cl.
*B66C 13/48* (2006.01)
*B66C 13/22* (2006.01)

(52) U.S. Cl.
CPC ............. *B66C 13/22* (2013.01); *B66C 13/48* (2013.01)

(58) Field of Classification Search
CPC ....... B66C 13/22; B66C 13/48; B66C 13/063; B66C 13/46; B66C 23/82; B66C 23/94; B66C 23/88
See application file for complete search history.

(56) References Cited

U.S. PATENT DOCUMENTS

| | | | | |
|---|---|---|---|---|
| 2007/0219662 | A1 | 9/2007 | Sawodny et al. | |
| 2019/0177130 | A1* | 6/2019 | Hayashi | B66C 13/48 |
| 2022/0127116 | A1 | 4/2022 | Minami | |

FOREIGN PATENT DOCUMENTS

| | | | | |
|---|---|---|---|---|
| CN | 108373109 A * | 8/2018 | | B66C 13/06 |
| EP | 0 732 299 A1 | 9/1996 | | |

(Continued)

OTHER PUBLICATIONS

Nov. 20, 2023 Extended Search Report issued in European Patent Application No. 21829404.9.

(Continued)

*Primary Examiner* — Justin Holmes
(74) *Attorney, Agent, or Firm* — Oliff PLC

(57) ABSTRACT

A cargo crane including an arm turning mechanism that turns a crane arm; an arm luffing mechanism that adjusts the luffing angle; an arm extension and contraction mechanism that adjusts the arm length; and a control device that calculates a trajectory in which a suspended cargo is conveyed, and that controls the mechanisms. The control device calculates the trajectory so as to be a straight line trajectory as viewed from at least the vertical direction; calculates a turning angle θ, a luffing angle φ, and an arm length L so as to cause the trajectory to be the straight line trajectory by using the cargo start position, the cargo target position, a maximum speed $v_{max}$, a suspended cargo swing cycle T, and a start-up time $T_1$; and controls the mechanisms so as to achieve the calculated turning angle θ, luffing angle φ, and arm length L.

19 Claims, 7 Drawing Sheets

(56) References Cited

FOREIGN PATENT DOCUMENTS

| | | | | |
|---|---|---|---|---|
| EP | 1 314 681 | B1 | | 1/2007 |
| JP | 2004-161460 | A | | 6/2004 |
| JP | 2005-067747 | A | | 3/2005 |
| JP | 4096473 | B2 | * | 6/2008 |
| JP | 2009-083977 | A | | 4/2009 |
| JP | 2011-111242 | A | | 6/2011 |
| JP | 2012-001324 | A | | 1/2012 |
| JP | 2012-041180 | A | | 3/2012 |
| JP | 2018-095369 | A | | 6/2018 |
| JP | 2020-158278 | A | | 10/2020 |
| WO | 2018/105740 | A1 | | 6/2018 |

OTHER PUBLICATIONS

Dec. 13, 2022 International Preliminary Report on Patentability issued in International application No. PCT/JP2021/018337.
Aug. 3, 2021 International Search Report issued in International Application No. PCT/JP2021/018337.
Nov. 8, 2022 Office Action issued in Japanese Patent Application No. 2021-550148.
Jan. 13, 2025 Office Action issued in Korean Patent Application No. 10-2022-7043885. (with concise explanation of relevance in English).

* cited by examiner

CARGO CRANE, CARGO-CRANE SWING PREVENTION METHOD, AND CARGO CONVEYANCE METHOD

TECHNICAL FIELD

The present invention relates to a cargo crane, a cargo-crane swing prevention method, and a cargo conveyance method.

BACKGROUND ART

In a steel works, when shipping products such as coils by sea, the products are conveyed by using a slewing cargo crane. This work is performed by shore-side workers who perform slinging work, crane operators who perform crane operation, and onboard workers who perform positioning and lashing of the coils in a ship, which is thus the work requiring many hands. Therefore, in light of a future reduction in working population, there is a need for work labor saving.

In the cargo conveyance work using the cargo crane described above, in order to automate the crane operation, it is necessary to perform control for preventing the swing of a suspended cargo automatically. As a method for performing the control for preventing the swing of the suspended cargo, methods have been conventionally employed, such as a method for performing swing prevention control by acceleration at a constant acceleration, uniform motion, and deceleration at a constant angular velocity while fixing the turning radius (PTLs 1 to 3), and a method for performing swing prevention control by using feedback control in the circumferential direction (PTL 4).

CITATION LIST

Patent Literature

PTL 1: JP 2004-161460 A

PTL 2: JP 2009-083977 A

PTL 3: JP 2012-001324 A

PTL 4: JP 2011-111242 A

SUMMARY OF INVENTION

Technical Problem

In PTLs 1 to 3, since the conveyance trajectory of a suspended cargo has an arc shape, not only cargo swing control in the advance direction of the suspended cargo (i.e., in the circumferential direction), but also cargo swing control in the turning radius direction is performed. Therefore, it is necessary to adjust the conveyance time to an integral multiple of a swing cycle of the suspended cargo, or adjust the swing cycle by changing the length of a rope during the conveyance, and in some cases, such an adjustment item becomes a constraint condition.

In PTL 4, since sensors that detect the position and speed of a suspended cargo are required for using the feedback control, the costs such as introduction cost of the sensors and additional control devices and maintenance cost are generated.

Therefore, the present invention has been made by focusing on the problems described above and has an object to provide a cargo crane, a cargo-crane swing prevention method, and a cargo conveyance method that can control swing prevention without constraint condition and with a simple control system when performing the conveyance from an arbitrary cargo start position to an arbitrary cargo target position.

Solution to Problem

According to one aspect of the present invention, there is provided a cargo crane configured to convey a suspended cargo from an arbitrary cargo start position to a cargo target position by a turning motion of a crane arm, the suspended cargo being suspended by a wire provided to an arm distal end portion of the crane arm, the cargo crane including: an arm turning mechanism configured to turn the crane arm; an arm luffing mechanism configured to adjust a luffing angle of the crane arm; an arm extension and contraction mechanism configured to adjust an arm length of the crane arm; and a control device configured to calculate a trajectory in which the suspended cargo is conveyed, and configured to control the arm turning mechanism, the arm luffing mechanism, and the arm extension and contraction mechanism, wherein the control device is configured to: calculate the trajectory to be a straight line trajectory as viewed from at least a vertical direction, according to the cargo start position and the cargo target position; using the cargo start position, the cargo target position, a maximum speed, a suspended cargo swing cycle, and a start-up time, calculate a turning angle of the crane arm, the luffing angle, and the arm length to cause the trajectory to be the straight line trajectory; and control the arm turning mechanism, the arm luffing mechanism, and the arm extension and contraction mechanism to achieve the turning angle, the luffing angle, and the arm length calculated.

According to one aspect of the present invention, there is provided a method for preventing a swing of a cargo crane configured to convey a suspended cargo from an arbitrary cargo start position to a cargo target position by a turning motion of a crane arm, the suspended cargo being suspended by a wire provided to an arm distal end portion of the crane arm, the method for preventing the swing of the cargo crane including: using, as the cargo crane, a cargo crane including an arm turning mechanism configured to turn the crane arm, an arm luffing mechanism configured to adjust a luffing angle of the crane arm, and an arm extension and contraction mechanism configured to adjust an arm length of the crane arm; calculating a trajectory in which the suspended cargo is conveyed, to be a straight line trajectory as viewed from at least a vertical direction, according to the cargo start position and the cargo target position; calculating a turning angle of the crane arm, the luffing angle, and the arm length to cause the trajectory to be the straight line trajectory by using the cargo start position, the cargo target position, a maximum speed, a suspended cargo swing cycle, and a start-up time; and controlling the arm turning mechanism, the arm luffing mechanism, and the arm extension and contraction mechanism to achieve the turning angle, the luffing angle, and the arm length calculated.

According to one aspect of the present invention, there is provided a cargo conveyance method by a cargo crane configured to convey a suspended cargo from an arbitrary cargo start position to a cargo target position by a turning motion of a crane arm, the suspended cargo being suspended by a wire provided to an arm distal end portion of the crane arm, wherein the cargo conveyance method conveys the suspended cargo by using the cargo crane.

Advantageous Effects of Invention

According to one aspect of the present invention, there are provided a cargo crane, a cargo-crane swing prevention method, and a cargo conveyance method that can control swing prevention without constraint condition and with a simple control system when performing the conveyance from an arbitrary cargo start position to an arbitrary cargo target position.

DESCRIPTION OF EMBODIMENTS

In the following detailed description, an embodiment of the present invention will be described with reference to the drawings. In description of the drawings, the same or like signs are given to the same or like portions, and duplicate description is omitted. The drawings are only exemplary, and there are included cases that differ from actual ones. Further, the embodiment given below merely exemplifies devices and methods for embodying the technical idea of the present invention. The technical idea of the present invention does not limit materials, structures, arrangements, and the like of constituent components to those described below. The technical idea of the present invention can be changed in various ways within the technical scope defined by the claims.

<Cargo Crane>

Figure 1:
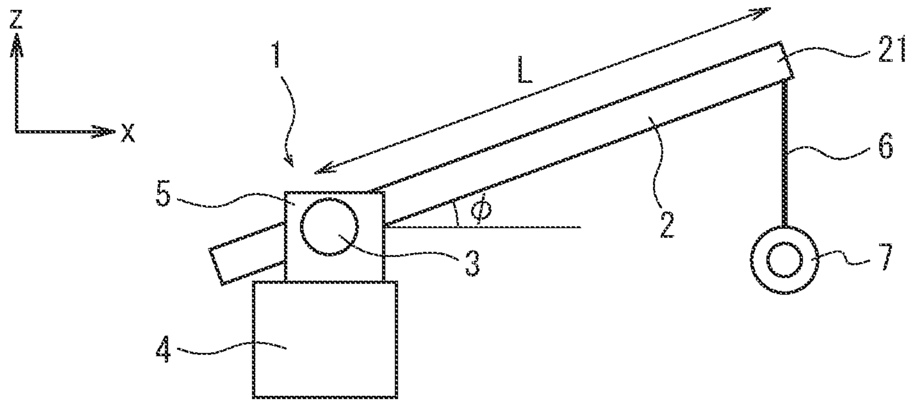
FIG. 1 is a side view illustrating a cargo crane according to an embodiment of the present invention.
Figure 2:
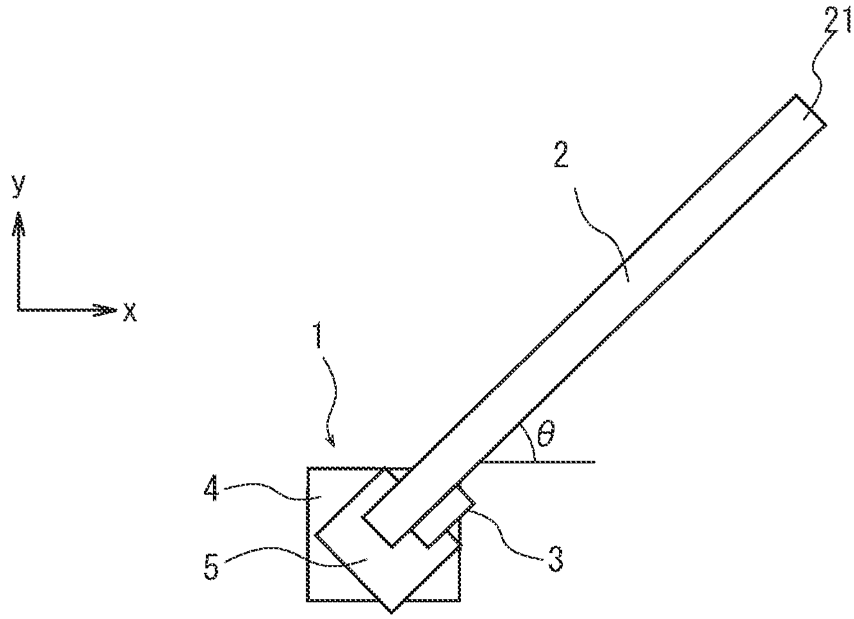
FIG. 2 is a plan view illustrating the cargo crane according to the embodiment of the present invention.

A cargo crane 1 according to an embodiment of the present invention will be described. As illustrated in FIGS. 1 and 2, the cargo crane 1 includes a crane arm 2, an arm luffing mechanism 3, an arm turning mechanism 4, an arm extension and contraction mechanism 5, and a wire 6. A distal end of the crane arm 2 to which the wire 6 is attached will also be referred to as an arm distal end portion 21. In the drawings, an x-axis, a y-axis, and a z-axis are the mutually perpendicular axes, the x-axis and the y-axis are the axes parallel to the horizontal direction, and the z-axis is the axis parallel to the vertical direction. The cargo crane 1 lifts a suspended cargo 7 attached to the tip of the wire 6 and conveys the suspended cargo 7 from a cargo start position $(x_1, y_1)$ to a cargo target position $(x_2, y_2)$. In this embodiment, as one example, the suspended cargo 7 is assumed to be a coil that is a product produced in a steel works.

The arm luffing mechanism 3 adjusts a luffing angle φ [°]. The luffing angle φ [°] is an angle of the crane arm 2 in its extending direction with respect to the horizontal direction. The arm turning mechanism 4 adjusts a turning angle θ [°] by turning the crane arm 2. The turning angle θ [°] is an angle of the crane arm 2 in its extending direction with respect to the x-axis direction. The arm extension and contraction mechanism 5 adjusts an arm length L [m]. The arm length L [m] is a protrusion length of the crane arm 2 in its extending direction from a support position of the crane arm 2 where the arm turning mechanism 4 is provided.

The cargo crane 1 is provided with a hoisting device (not illustrated) that adjusts the wire length of the wire 6 from the arm distal end portion 21. Further, the cargo crane 1 is provided with a control device (not illustrated). In order to convey the suspended cargo 7 from the cargo start position $(x_1, y_1)$ to the cargo target position $(x_2, y_2)$, the control device controls the arm luffing mechanism 3, the arm turning mechanism 4, the arm extension and contraction mechanism 5, and the hoisting device to adjust the luffing angle φ, the turning angle θ, the arm length L, and the wire length. The control device calculates a trajectory of the suspended cargo 7 so as to be a straight line trajectory as viewed from at least the vertical direction (z-axis direction), according to the cargo start position and the cargo target position. Thereafter, using the cargo start position, the cargo target position, a maximum speed $v_{max}$, a suspended cargo swing cycle T, and a start-up time $T_1$, the control device calculates the turning angle θ, the luffing angle φ, and the arm length L of the crane arm 2 so that the trajectory of the suspended cargo 7 becomes the straight line trajectory. Then, the control device controls the arm turning mechanism 4, the arm luffing mechanism 3, and the arm extension and contraction mechanism 5 so as to achieve the calculated turning angle θ, luffing angle φ, and arm length L, thereby conveying the suspended cargo 7. The details of a method for preventing the swing of the cargo crane 1 by the control device will be described later.

<Cargo-Crane Swing Prevention Method>

Figure 3:
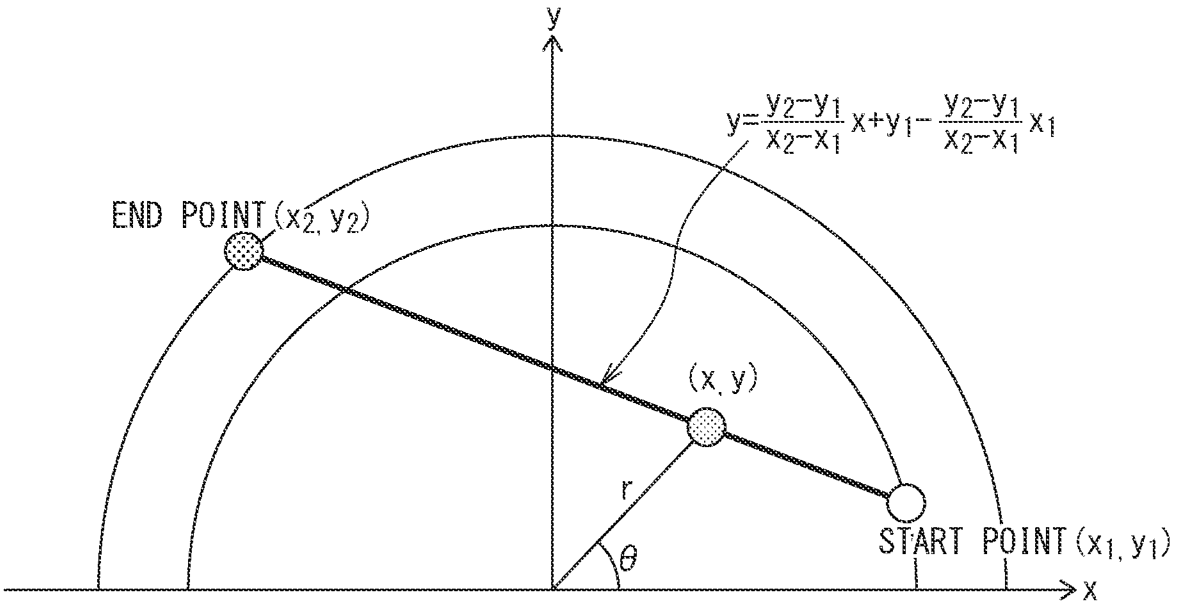
FIG. 3 is an explanatory diagram illustrating a trajectory of an arm distal end portion of a crane arm.

In a method for preventing the swing of the cargo crane 1 according to this embodiment, as illustrated in FIG. 3, the suspended cargo 7 is conveyed from a start point $(x_1, y_1)$ being the cargo start position to an end point $(x_2, y_2)$ being the cargo target position. In a coordinate system illustrated in FIG. 3, the position of the origin is the position of the turning center of the crane arm 2. In this embodiment, the suspended cargo 7 is conveyed in a straight line from the start point $(x_1, y_1)$ to the end point $(x_2, y_2)$ in at least an x-y plane as viewed from the z-direction (vertical direction). In this event, the conveyance path of the suspended cargo 7 in the x-y plane forms a straight line trajectory given by a formula (1) below. In the formula (1), x and y represent an x-coordinate and a y-coordinate of the arm distal end portion 21 of the crane arm 2, respectively.

[Math. 1]

$$y = \frac{y_2 - y_1}{x_2 - x_1}x + y_1 - \frac{y_2 - y_1}{x_2 - x_1}x_1 \tag{1}$$

When conveying the suspended cargo 7 on this straight line trajectory, a position (x, y) of the arm distal end portion 21 is given by a formula (2) and a formula (3) below by using a turning radius r [m] of the cargo crane 1. Further, from the formulas (1) to (3), the turning radius r is given by a formula (4) below.

[Math. 2]

$$x = r\cos\theta \tag{2}$$

$$y = r\sin\theta \tag{3}$$

$$r = \frac{y_1 - \frac{y_2 - y_1}{x_2 - x_1}x_1}{\sin\theta - \frac{y_2 - y_1}{x_2 - x_1}\cos\theta} \tag{4}$$

Further, x and y representing the position of the arm distal end portion 21 are given by a formula (5) and a formula (6) below by using a turning angle θ.

[Math. 3]

$$x = \frac{y_1 - \frac{y_2 - y_1}{x_2 - x_1}x_1}{\sin\theta - \frac{y_2 - y_1}{x_2 - x_1}\cos\theta}\cos\theta \tag{5}$$

$$y = \frac{y_1 - \frac{y_2 - y_1}{x_2 - x_1}x_1}{\sin\theta - \frac{y_2 - y_1}{x_2 - x_1}\cos\theta}\sin\theta \tag{6}$$

Consequently, a speed v [m/s] of the arm distal end portion 21 in the x-y plane is given by a formula (7) below.

[Math. 4]

$$v = \sqrt{\left(\frac{dx}{dt}\right)^2 + \left(\frac{dy}{dt}\right)^2} = \frac{-y_1 + \frac{y_2 - y_1}{x_2 - x_1}x_1}{\left(\sin\theta - \frac{y_2 - y_1}{x_2 - x_1}\cos\theta\right)^2}\sqrt{1 + \left(\frac{y_2 - y_1}{x_2 - x_1}\right)^2}\frac{d\theta}{dt} \tag{7}$$

By solving the above for a turning angular velocity dθ/dt, it is possible to derive a turning angular velocity dθ/dt (formula (8) below) that is required for moving the arm distal end portion 21 of the crane arm 2 at the speed v in the straight line trajectory of FIG. 3. Note that t represents a time (elapsed time) [s] from the start of turning.

[Math. 5]

$$\frac{d\theta}{dt} = -\frac{\left(\sin\theta - \frac{y_2 - y_1}{x_2 - x_1}\cos\theta\right)^2}{\left(-y_1 + \frac{y_2 - y_1}{x_2 - x_1}x_1\right)\sqrt{1 + \left(\frac{y_2 - y_1}{x_2 - x_1}\right)^2}}v \tag{8}$$

Figure 4:
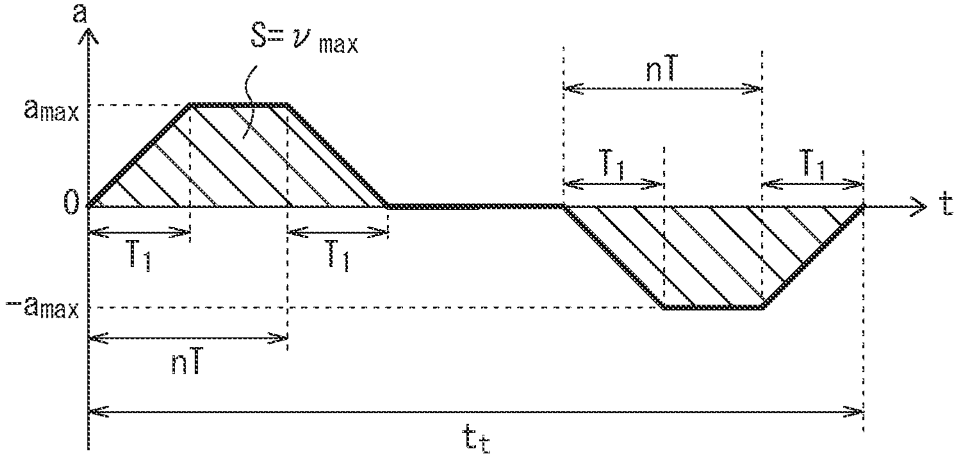
FIG. 4 is a graph illustrating a control pattern of acceleration of the arm distal end portion.

Subsequently, a control pattern of the speed v of the arm distal end portion 21 will be described. As illustrated in FIG. 4, first, an acceleration a is linearly raised for a start-up time $T_1$ [s] being a fixed time. The start-up time $T_1$ is a predetermined time for changing the acceleration a and is preferably as short a time as possible within a range of equipment specification. Then, the acceleration is performed at a constant acceleration a for a time (nT) that is n (natural number) times a swing cycle T. Since the conveyance time is preferably as short as possible, n=1 is preferable if it is possible in terms of the output of the equipment. The swing cycle T is defined by a formula (9) below. In the formula (9), l represents a length [m] of the wire 6, and G represents a gravitational acceleration [m/s²].

[Math. 6]

$$T = 2\pi\sqrt{\frac{l}{G}} \tag{9}$$

Further, the acceleration a is linearly reduced for time $T_1$ so as to perform the conveyance at a constant speed. Consequently, the swing angle of the suspended cargo 7 becomes 0° during the conveyance at the constant speed. Thereafter, when stopping, an operation reverse to that during the acceleration is performed so as to stop the suspended cargo 7 at the target position with the swing angle of 0°.

Figure 5:
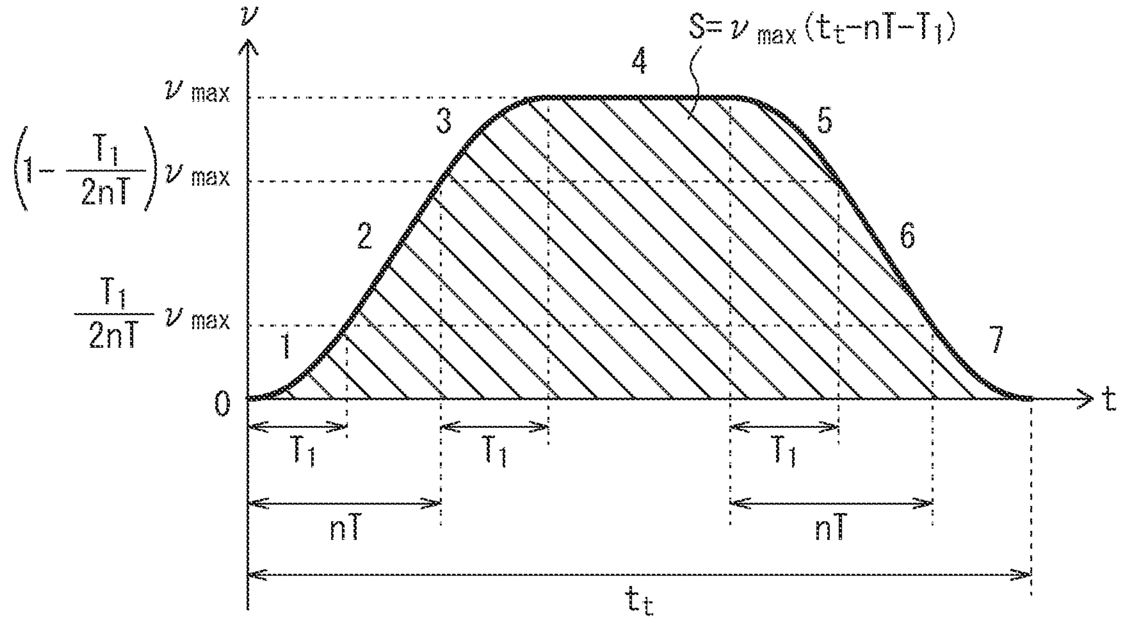
FIG. 5 is a graph illustrating a control pattern of speed of the arm distal end portion.

FIG. 5 illustrates a temporal change of the speed v of the arm distal end portion 21 when the control described above is performed. In FIG. 5, $t_r$ represents a suspended cargo conveyance time [s], and the suspended cargo conveyance time $t_r$ is set so that an area S defined by oblique lines in a graph of FIG. 5 (i.e., an integrated value of the graph) and given by a formula (10) below becomes a distance from the cargo start position to the cargo target position. In the formula (10) and the like, $v_{max}$ represents a maximum speed [m/s] that is a speed in the low speed constant-speed running. Then, by substituting the speed v into the formula (8), a turning angular velocity dθ/dt at each of times t given by formulas (11) to (17) is derived. The formula (11) represents a speed v of the arm distal end portion 21 at a time when $t<T_1$, the formula (12) at a time when $T_1 \le t < nT$, the formula (13) at a time when $nT \le t < nT+T_1$, the formula (14) at a time when $nT+T_1 \le t < t_r-nT-T_1$, the formula (15) at a time when $t_r-nT-T_1 \le t < t_r-nT$, the formula (16) at a time when $t_r-nT \le t < t_r-T_1$, and the formula (17) at a time when $t_r-T_1 \le t \le t_r$.

[Math. 7]

$$S = v_{max}(t_r - nT - T_1) \tag{10}$$

$$v = \frac{v_{max}}{2nTT_1}t^2 \tag{11}$$

$$v = \frac{v_{max}}{nT}(t - T_1) + \frac{v_{max}T_1}{2nT} \tag{12}$$

$$v = -\frac{v_{max}}{2nTT_1}(t - nT - T_1)^2 + v_{max} \tag{13}$$

$$v = v_{max} \tag{14}$$

$$v = -\frac{v_{max}}{2nTT_2}(t - t_r + nT + T_1)^2 + v_{max} \tag{15}$$

$$v = -\frac{v_{max}}{nT}(t - t_r + T_1) + \frac{v_{max}T_1}{2nT} \tag{16}$$

$$v = \frac{v_{max}}{2nTT_1}(t - t_r)^2 \tag{17}$$

Next, control of a luffing angle φ and an arm length L of the crane arm 2 will be described. The turning radius r of the cargo crane 1 is given by a formula (18) below by using an arm length L and a luffing angle φ. Then, by substituting the formula (18) into the formula (4) and time-differentiating both sides, a formula (19) below is derived. Further, when conveying the suspended cargo 7 at a constant height, since L sin φ is constant, it is possible to obtain a formula (20)

below. Then, from the formula (19) and the formula (20), a formula (21) and a formula (22) below are derived.

[Math. 8]

$$L = r\cos\varphi \tag{18}$$

$$-L\frac{d\varphi}{dt}\sin\varphi + \frac{dL}{dt}\cos\varphi = \frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\frac{d\theta}{dt} \tag{19}$$

$$L\frac{d\varphi}{dt}\cos\varphi + \frac{dL}{dt}\sin\varphi = 0 \tag{20}$$

$$\frac{dL}{dt} = \frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\cos\varphi\frac{d\theta}{dt} \tag{21}$$

$$\frac{dL}{dt} = -\frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\frac{\sin\varphi}{L}\frac{d\theta}{dt} \tag{22}$$

That is, in the method for preventing the swing of the cargo crane 1 according to this embodiment, when conveying the suspended cargo 7 by the cargo crane 1, first, the trajectory from the cargo start position ($x_1$, $y_1$) to the cargo target position ($x_2$, $y_2$) is calculated by the control device or the like provided in the cargo crane 1. In this event, the calculation is performed so that the trajectory from the cargo start position ($x_1$, $y_1$) to the cargo target position ($x_2$, $y_2$) becomes the straight line trajectory in the x-y plane as viewed from the z-direction. In this calculation, it is preferable to determine the turning angle θ of the crane arm 2 by using the formula (8). Then, in the method for preventing the swing of the cargo crane 1 according to this embodiment, the suspended cargo 7 is conveyed from the cargo start position to the cargo target position in the calculated trajectory.

Consequently, in the cargo swing control of the suspended cargo 7, it is sufficient to only control the cargo swing in the advance direction of the suspended cargo 7, and thus it is not necessary to control the cargo swing in the turning radius direction as opposed to PTLs 1 to 3. Therefore, the adjustment items for the cargo swing control are reduced in number so that the control becomes easier. According to this embodiment, the conveyance distance is reduced compared to the case where the conveyance is performed in the arc-shaped trajectory like in PTLs 1 to 3, and therefore it is possible to shorten the conveyance time. Further, according to this embodiment, even when the turning radius differs at the cargo start position and at the cargo target position, differently from PTLs 1 to 3, it is not necessary to additionally perform an operation to absorb the cargo swing in the turning radius direction. Further, in this embodiment, since it is not necessary to use feedback control, there is no need for the introduction of sensors that detect the position and speed of the suspended cargo 7, the introduction of control devices following the addition of the sensors, or the like. Therefore, according to this embodiment, compared to PTL 4, the equipment configuration can be simplified so that it is possible to reduce the costs for introduction of the equipment, maintenance, and the like.

In the method for preventing the swing of the cargo crane 1 according to this embodiment, after the straight line trajectory for conveying the suspended cargo 7 is calculated, the speed v of the arm distal end portion 21 in the x-y plane is calculated by the control device or the like provided in the cargo crane 1. In this event, the speed v of the arm distal end portion 21 in the x-y plane is preferably calculated by the formulas (11) to (17) according to time t from the start of turning. In this event, the suspended cargo conveyance time $t_t$ is obtained from the formula (10) according to the distance in the x-y plane from the cargo start position to the cargo target position. The maximum speed $v_{max}$, the swing cycle T, the constant n, and the start-up time $T_1$ that are set in the formula (10) may be set in advance. Consequently, it is possible to suppress the cargo swing in the advance direction of the suspended cargo 7.

Further, in the method for preventing the swing of the cargo crane 1 according to this embodiment, it is preferable to control the arm length L and the luffing angle φ of the crane arm 2 by the control device under a condition satisfying the formula (19). When wishing to control the suspended cargo 7 at a constant height, it is preferable to further control the arm length L and the luffing angle φ of the crane arm 2 by the formula (21) and the formula (22).

<Modifications>

While the present invention has been described with reference to the specific embodiment, it is not intended to limit the invention by the description given above. By referring to the description of the present invention, the disclosed embodiment and also other embodiments of the present invention including various modifications are obvious for those skilled in the art. Therefore, it should be construed that the embodiments of the invention described in the claims also cover embodiments including modifications taken alone or in combination that are described in this description.

For example, in the embodiment described above, it is assumed that the straight line trajectory of the suspended cargo 7 connecting the cargo start position and the cargo target position is constant in height, but the present invention is not limited to such an example. The height of the suspended cargo 7 may be configured not to be constant.

Further, in the embodiment described above, the suspended cargo 7 is assumed to be a hot-rolled coil, but the present invention is not limited to such an example. The suspended cargo 7 may be another as long as it is conveyed by the cargo crane 1 as illustrated in FIGS. 1 and 2.

Effects of Embodiment (1) The cargo crane 1 according to one aspect of the present invention is the cargo crane 1 that conveys the suspended cargo 7 from an arbitrary cargo start position to a cargo target position by the turning motion of the crane arm 2, the suspended cargo 7 being suspended by the wire 6 provided to the arm distal end portion 21 of the crane arm 2, the cargo crane 1 including: the arm turning mechanism 4 that turns the crane arm 2; the arm luffing mechanism 3 that adjusts the luffing angle φ of the crane arm 2; the arm extension and contraction mechanism 5 that adjusts the arm length L of the crane arm 2; and the control device that calculates a trajectory in which the suspended cargo 7 is conveyed, and that controls the arm turning mechanism 4, the arm luffing mechanism 3, and the arm extension and contraction mechanism 5, wherein the control device calculates the trajectory so as to be a straight line trajectory as viewed from at least the vertical direction, according to the cargo start position and the cargo target position; calculates the turning angle θ, the luffing angle φ, and the arm length L of the crane arm 2 so as to cause the trajectory to be the straight line trajectory by using the cargo start position, the cargo target position, the maximum speed $v_{max}$, the suspended cargo swing cycle T, and the start-up time $T_1$; and controls the arm turning mechanism 4, the arm luffing mechanism 3, and the arm extension and contraction mechanism 5 so as to achieve the calculated turning angle θ, luffing angle φ, and arm length L.

According to the configuration (1) described above, since the suspended cargo 7 is conveyed in the straight line trajectory, compared to the case where the conveyance is performed in the arc-shaped trajectory, the adjustment items for the cargo swing control are reduced in number so that the control becomes easier. Also, it is possible to shorten the conveyance time. Further, since it is not necessary to use feedback control, the equipment configuration can be simplified so that it is possible to reduce the costs for introduction of the equipment, maintenance, and the like.

(2) In the configuration (1) described above, the control device calculates so that the height of the straight line trajectory in the vertical direction becomes constant.

According to the configuration (2) described above, it is possible to convey the suspended cargo 7 at a constant height.

(3) In the configuration (1) or (2) described above, the control device calculates the turning angle θ from the formula (8) by using a speed v of the arm distal end portion 21 calculated from each of the formulas (11) to (17); and when calculating the speed v, uses the formula (11) at a time when $t<T_1$, uses the formula (12) at a time when $T_1 \le t<nT$, uses the formula (13) at a time when $nT \le t<nT+T_1$, uses the formula (14) at a time when $nT+T_1 \le t<t_r-nT-T_1$, uses the formula (15) at a time when $t_r-nT-T_1 \le t<t_r-nT$, uses the formula (16) at a time when $t_r-nT \le t<t_r-T_1$, and uses the formula (17) at a time when $t_r-T_1 \le t \le t_r$.

According to the configuration (3) described above, it is possible to control the cargo swing of the suspended cargo 7 with a simple control method.

(4) In anyone of the configurations (1) to (3) described above, the control device controls the luffing angle φ and the arm length L under a condition satisfying the formula (19).

According to the configuration (4) described above, it is possible to convey the suspended cargo 7 in the straight line trajectory with a simple control method.

(5) In anyone of the configurations (1) to (4) described above, the control device controls the luffing angle φ and the arm length L under a condition satisfying the formula (21) and the formula (22).

According to the configuration (5) described above, it is possible to convey the suspended cargo 7 at a constant height with a simple control method.

(6) The cargo-crane swing prevention method according to one aspect of the present invention is a method for preventing the swing of the cargo crane 1 that conveys the suspended cargo 7 from an arbitrary cargo start position to a cargo target position by the turning motion of the crane arm 2, the suspended cargo 7 being suspended by the wire 6 provided to the arm distal end portion 21 of the crane arm 2, the method for preventing the swing of the cargo crane 1 including: using, as the cargo crane 1, a cargo crane including the arm turning mechanism 4 that turns the crane arm 2, the arm luffing mechanism 3 that adjusts the luffing angle φ of the crane arm 2, and the arm extension and contraction mechanism 5 that adjusts the arm length L of the crane arm 2; calculating a trajectory in which the suspended cargo 7 is conveyed, so as to be a straight line trajectory as viewed from at least the vertical direction, according to the cargo start position and the cargo target position; calculating the turning angle θ, the luffing angle φ, and the arm length L of the crane arm 2 so as to cause the trajectory to be the straight line trajectory by using the cargo start position, the cargo target position, the maximum speed $v_{max}$, the suspended cargo swing cycle T, and the start-up time $T_1$; and controlling the arm turning mechanism 4, the arm luffing mechanism 3, and the arm extension and contraction mechanism 5 so as to achieve the calculated turning angle θ, luffing angle φ, and arm length L.

According to the configuration (6) described above, the same effects as those of the configuration (1) described above are obtained.

(7) The cargo conveyance method according to one aspect of the present invention is a cargo conveyance method by the cargo crane 1 that conveys the suspended cargo 7 from an arbitrary cargo start position to a cargo target position by the turning motion of the crane arm 2, the suspended cargo 7 being suspended by the wire 6 provided to the arm distal end portion 21 of the crane arm 2, wherein the cargo conveyance method conveys the suspended cargo by using the cargo crane 1 of any one of the configurations (1) to (5) described above.

According to the configuration (7) described above, the same effects as those of the configurations (1) to (5) described above are obtained.

Example 1

Next, Example 1 conducted by the present inventors will be described. In Example 1, the same swing prevention control as that in the embodiment described above was performed with the cargo crane 1 illustrated in FIG. 1, and a hot-rolled coil with a weight of 10 t suspended by the wire 6 with a length of 10 m was conveyed as the suspended cargo 7. In Example 1, the suspended cargo 7 was conveyed from a cargo start position (20,0) to a cargo target position (−5, 15) in a coordinate system (x,y) (unit [m]) with its origin at the turning center of the cargo crane 1. In Example 1, as an initial condition of the crane arm 2, the turning angle θ was set to 0°, the luffing angle φ to 48°, and the arm length L to 30 m. Further, the turning start-up time $T_1$ was set to the half of the swing cycle T of the suspended cargo 7, the maximum speed $v_{max}$ to 1.5 m/s, and the constant n in the formulas (11) to (17) to 1.

Figure 6:
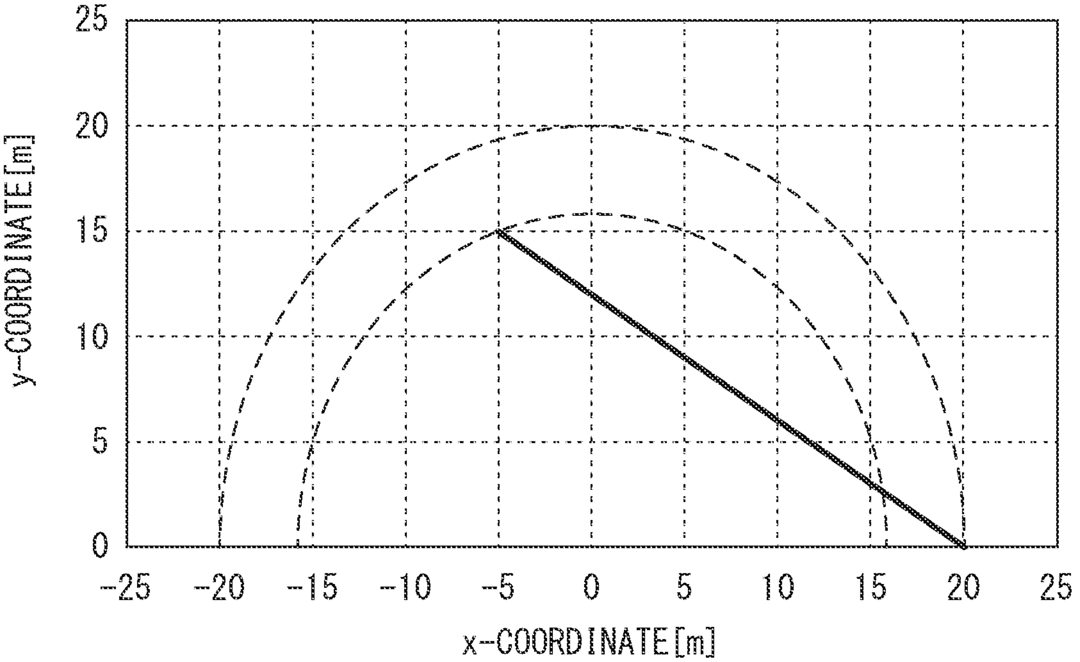
FIG. 6 is an explanatory diagram illustrating a locus of a suspended cargo in Example 1.
Figure 7:
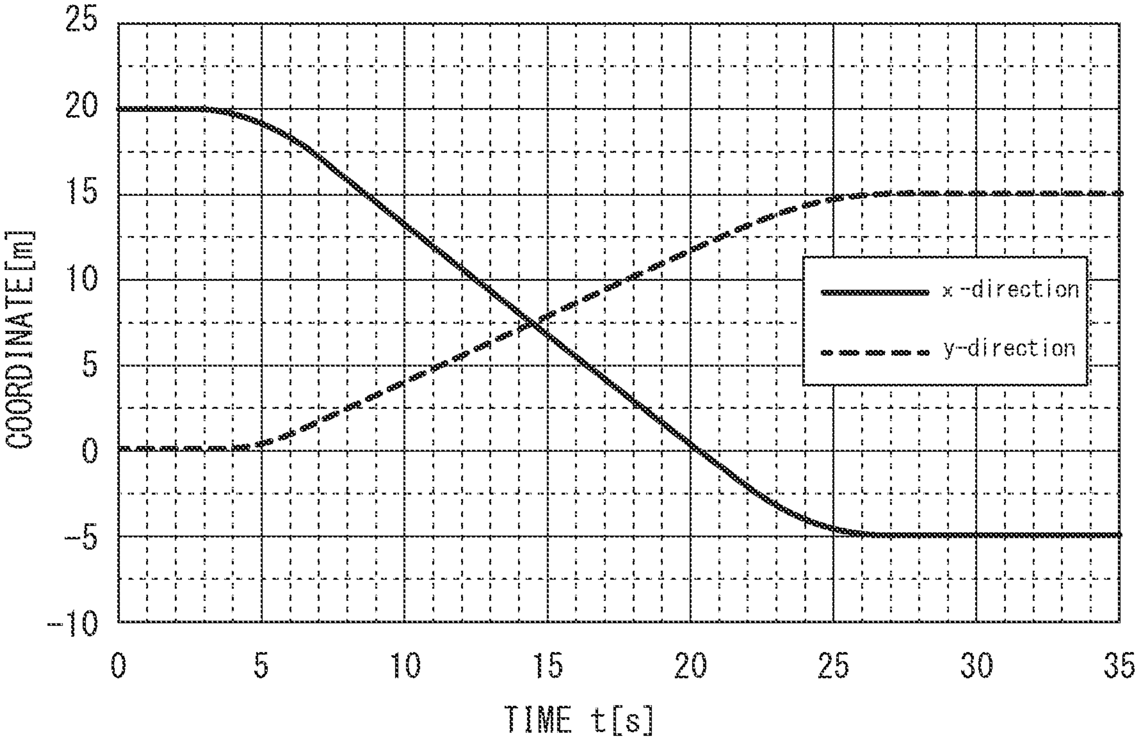
FIG. 7 is a graph illustrating a temporal change of a coordinate position of the suspended cargo in Example 1.
Figure 8:
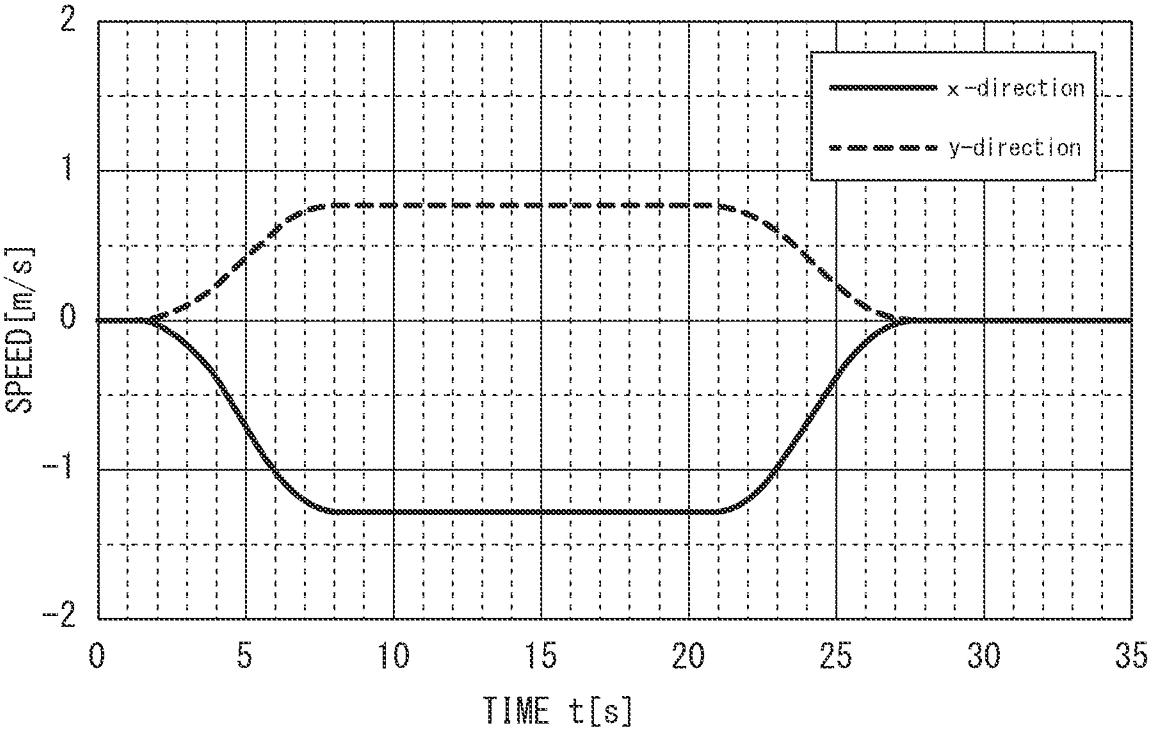
FIG. 8 is a graph illustrating a temporal change of a speed of the suspended cargo in Example 1.

FIG. 6 illustrates a locus of the suspended cargo 7 in Example 1. FIG. 7 illustrates a change of a coordinate position of the suspended cargo 7 in the x-direction and the y-direction at times t. It is seen that the suspended cargo 7 was moved linearly from the cargo start position to the cargo target position. FIG. 8 illustrates a change of the speed v of the suspended cargo 7 at times t. It has been confirmed that the speed v becomes zero at the time t when the cargo target position is reached. From this, it has been confirmed that the swing prevention control of the suspended cargo 7 is effected.

Example 2

Further, the present inventors conducted Example 2 by using the same cargo crane 1 as that in Example 1. In Example 2, the suspended cargo 7 was conveyed from a cargo start position (10,10) to a cargo target position (−5, 15) in a coordinate system (x,y) (unit [m]) with its origin at the turning center of the cargo crane 1. In Example 2, as an initial condition of the crane arm 2, the turning angle θ was set to 45°, the luffing angle φ to 62°, and the arm length L to 30 m. Further, the turning start-up time $T_1$ was set to the half of the swing cycle T of the suspended cargo 7, the maximum speed $v_{max}$ to 1.5 m/s, and the constant n in the formulas (11) to (17) to 1.

Figure 9:
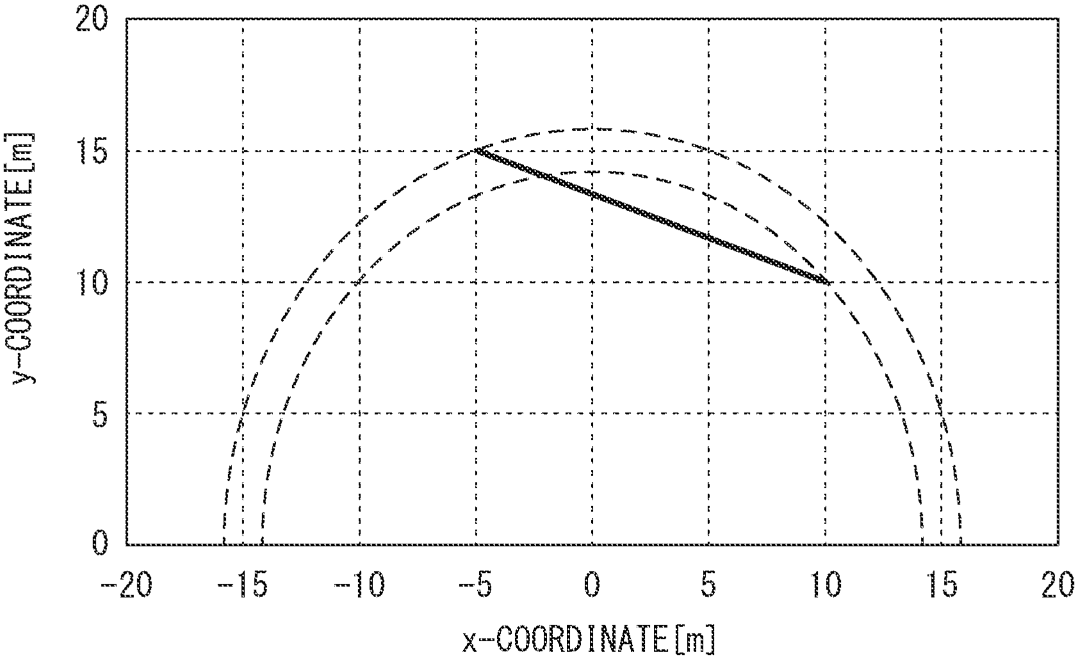
FIG. 9 is an explanatory diagram illustrating a locus of a suspended cargo in Example 2.
Figure 10:
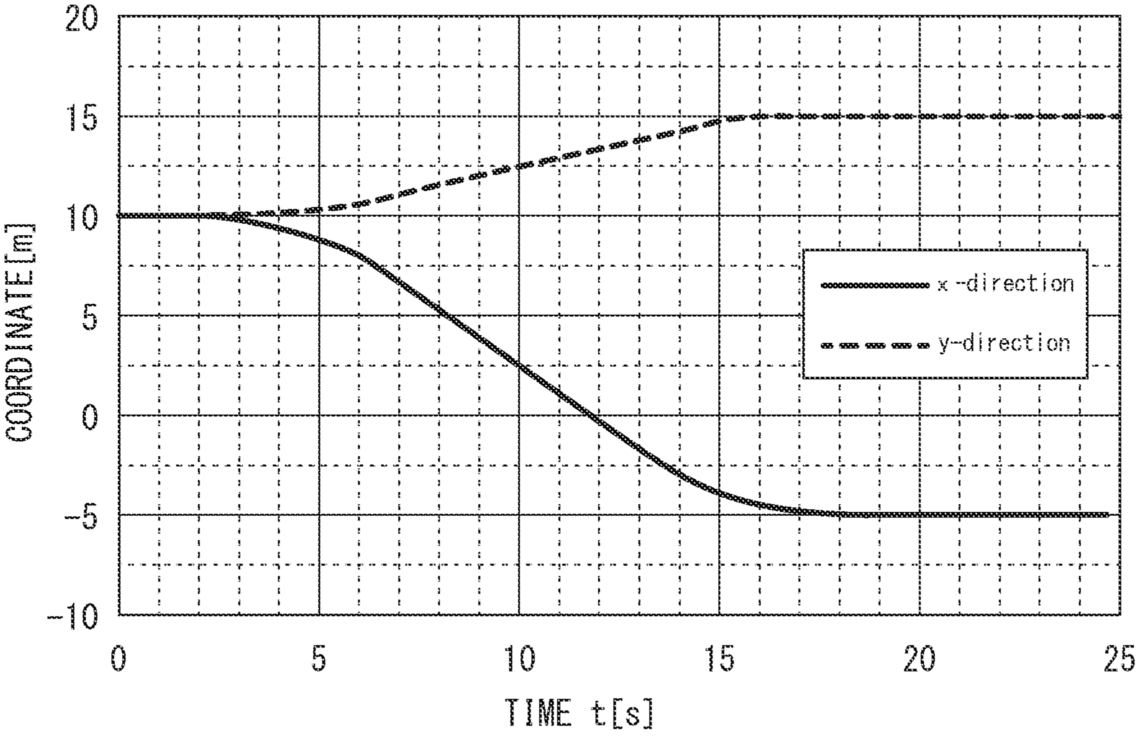
FIG. 10 is a graph illustrating a temporal change of a coordinate position of the suspended cargo in Example 2.
Figure 11:
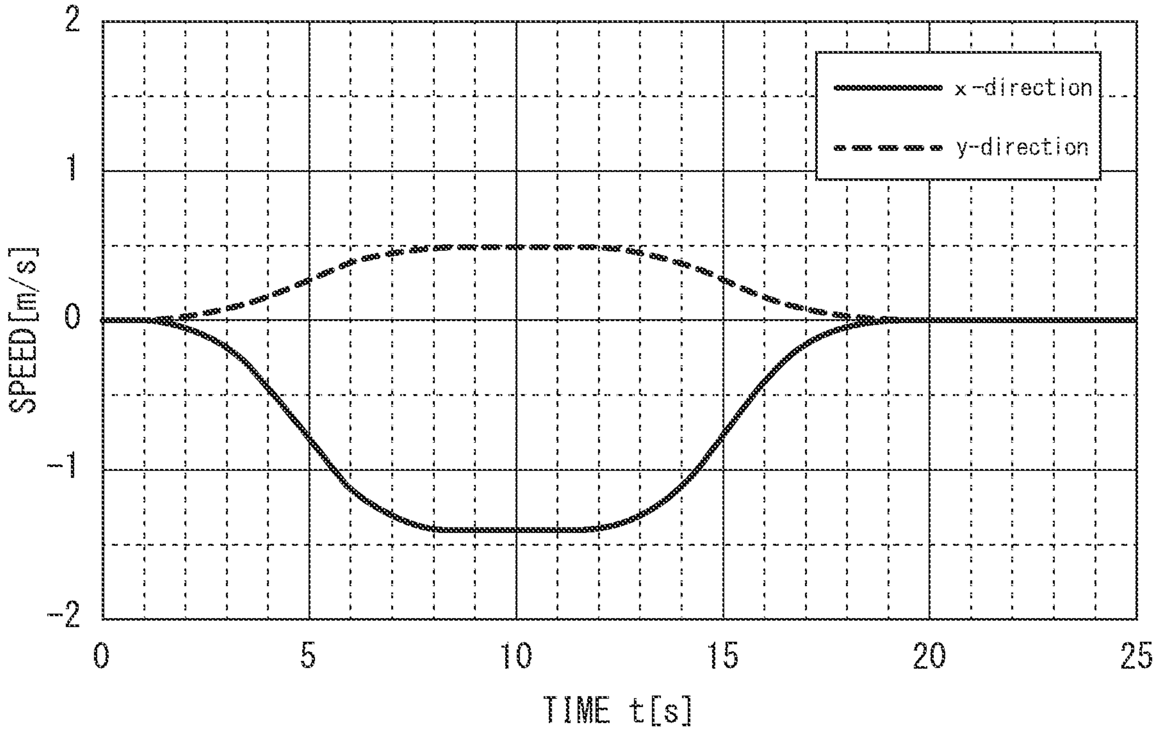
FIG. 11 is a graph illustrating a temporal change of a speed of the suspended cargo in Example 2.

FIG. 9 illustrates a locus of the suspended cargo 7 in Example 2. FIG. 10 illustrates a change of a coordinate position of the suspended cargo 7 in the x-direction and the y-direction at times t. It is seen that the suspended cargo 7 was moved linearly from the cargo start position to the cargo target position. FIG. 11 illustrates a change of the speed v of the suspended cargo 7 at times t. It has been confirmed that the speed v becomes zero at the time t when the cargo target position is reached. From this, it has been confirmed that the swing prevention control of the suspended cargo 7 is effected like in Example 1.

Example 3

Further, the present inventors conducted Example 3 by using the same cargo crane 1 as that in Example 1. Example 3, the suspended cargo 7 was conveyed from a cargo start position (20,0) to a cargo target position (−5,15) in a coordinate system (x,y) (unit [m]) with its origin at the turning center of of the cargo crane 1. In Example 3, as an initial condition of the crane arm 2, the turning angle θ was set to 0°, the luffing angle φ to 48°, and the arm length L to 30 m. Further, the turning start-up time $T_1$ was set to the half of the swing cycle T of the suspended cargo 7, the maximum speed $v_{max}$ to 1.5 m/s, and the constant n in the formulas (11) to (17) to 1.

Figure 12:
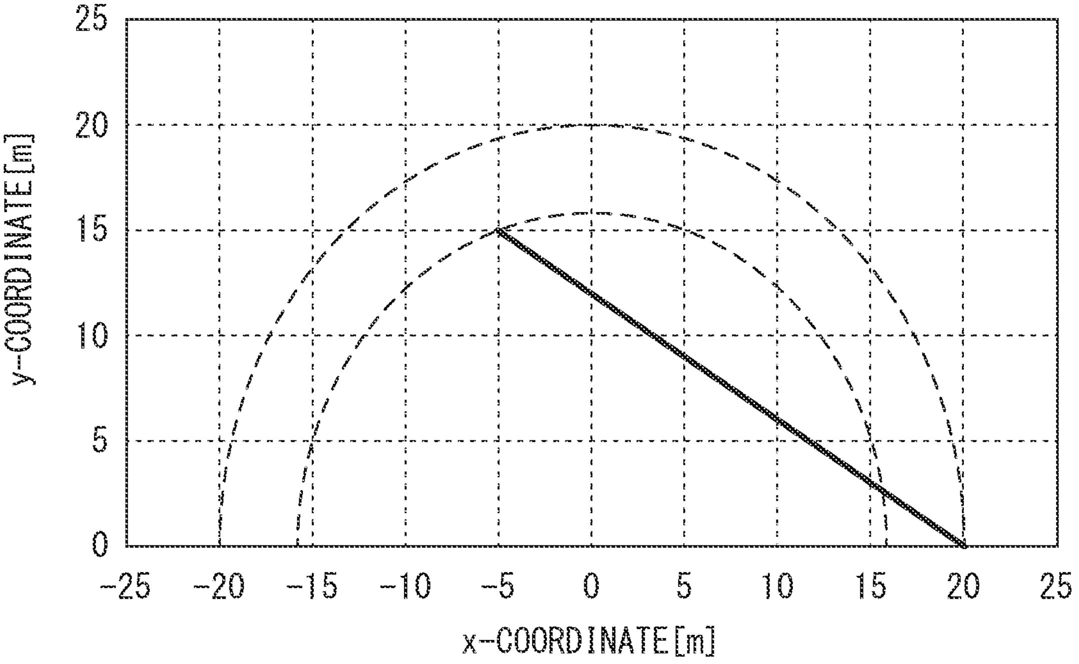
FIG. 12 is an explanatory diagram illustrating a locus of a suspended cargo in Example 3.
Figure 13:
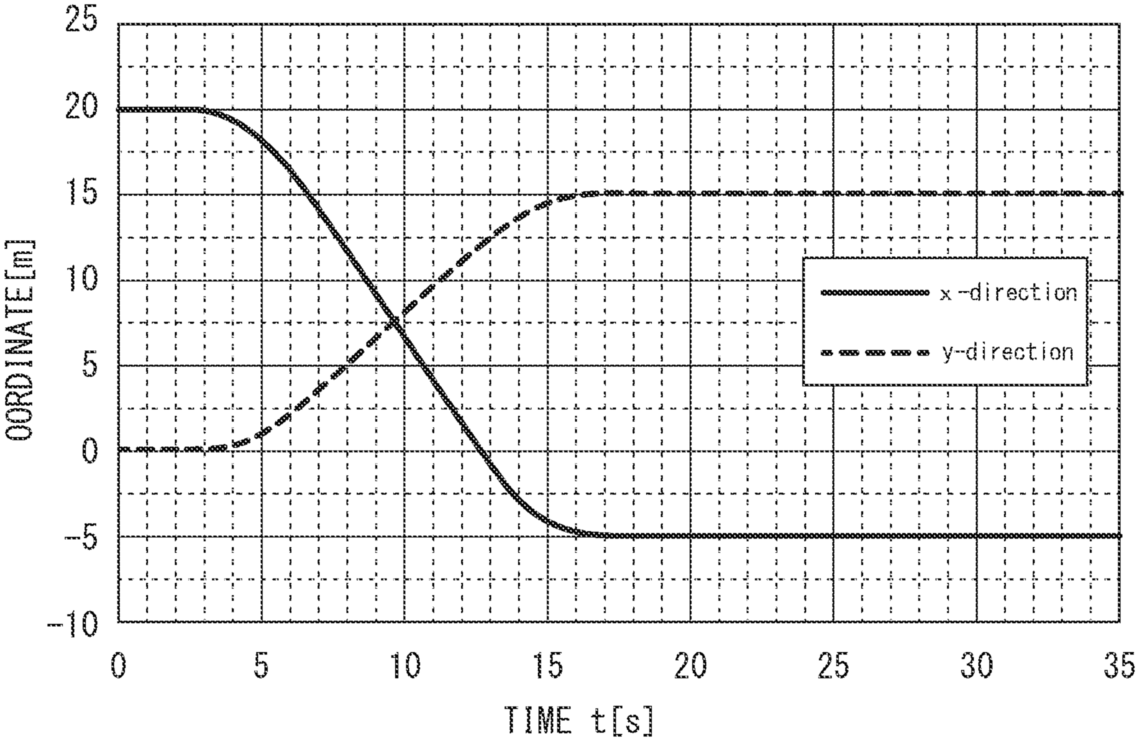
FIG. 13 is a graph illustrating a temporal change of a coordinate position of the suspended cargo in Example 3.
Figure 14:
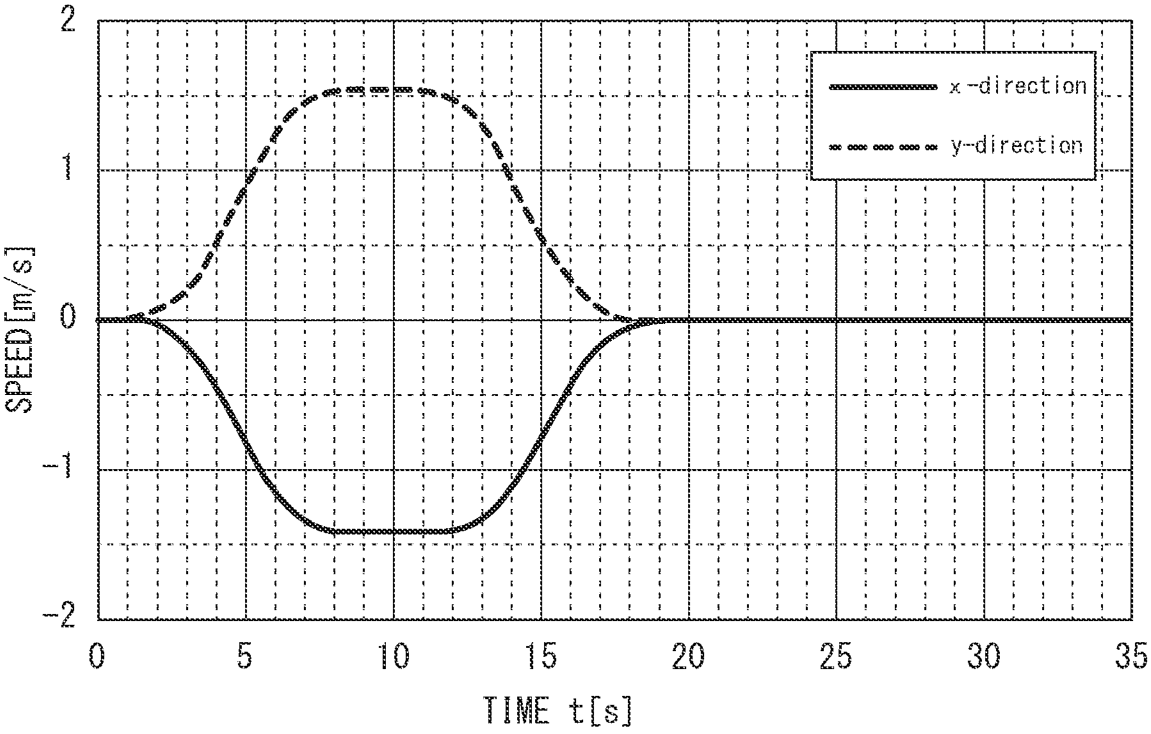
FIG. 14 is a graph illustrating a temporal change of a speed of the suspended cargo in Example 3.

FIG. 12 illustrates a locus of the suspended cargo 7 in Example 3. FIG. 13 illustrates a change of a coordinate position of the suspended cargo 7 in the x-direction and the y-direction at times t. It is seen that the suspended cargo 7 was moved linearly from the cargo start position to the cargo target position. FIG. 14 illustrates a change of the speed v of the suspended cargo 7 at times t. It has been confirmed that the speed v becomes zero at the time t when the cargo target position is reached. From this, it has been confirmed that the swing prevention control of the suspended cargo 7 is effected like in Example 1.

REFERENCE SIGNS LIST

1 cargo crane
2 crane arm
21 arm distal end portion
3 arm luffing mechanism
4 arm turning mechanism
5 arm extension and contraction mechanism
6 wire
7 suspended cargo

The invention claimed is:

1. A cargo crane configured to convey a suspended cargo from an arbitrary cargo start position to a cargo target position by a turning motion of a crane arm, the suspended cargo being suspended by a wire provided to an arm distal end portion of the crane arm, the cargo crane comprising:

- an arm turning mechanism configured to turn the crane arm;
- an arm luffing mechanism configured to adjust a luffing angle of the crane arm;
- an arm extension and contraction mechanism configured to adjust an arm length of the crane arm; and
- a control device configured to calculate a trajectory in which the suspended cargo is conveyed, and configured to control the arm turning mechanism, the arm luffing mechanism, and the arm extension and contraction mechanism, wherein the control device is configured to:

- calculate the trajectory to be a straight line trajectory as viewed from at least a vertical direction, according to the cargo start position and the cargo target position;
- using the cargo start position, the cargo target position, a maximum speed, a suspended cargo swing cycle, and a start-up time, calculate a turning angle of the crane arm, the luffing angle, and the arm length to cause the trajectory to be the straight line trajectory; and
- control the arm turning mechanism, the arm luffing mechanism, and the arm extension and contraction mechanism to achieve the turning angle, the luffing angle, and the arm length calculated.

2. The cargo crane according to claim 1, wherein the control device is configured to perform a calculation to cause a height of the straight line trajectory in the vertical direction to be constant.

3. The cargo crane according to claim 2, wherein the control device is configured to:

- calculate the turning angle from a formula (8) by using a speed of the arm distal end portion calculated from each of formulas (11) to (17); and
- when calculating the speed, use the formula (11) at a time when $t<T_1$, use the formula (12) at a time when $T_1 \le t < nT$, use the formula (13) at a time when $nT \le t < nT+T_1$, use the formula (14) at a time when $nT+T_1 \le t < t_r-nT-T_1$, use the formula (15) at a time when $t_r-nT-T_1 \le t < t_r-nT$, use the formula (16) at a time when $t_r-nT \le t < t_r-T_1$, and use the formula (17) at a time when $t_r-T_1 \le t \le t_r$:

[Math. 4]

$$\frac{d\theta}{dt} = \frac{\left(\sin\theta - \frac{y_2 - y_1}{x_2 - x_1}\cos\theta\right)^2}{\left(-y_1 + \frac{y_2 - y_1}{x_2 - x_1}x_1\right)\sqrt{1 + \left(\frac{y_2 - y_1}{x_2 - x_1}\right)^2}}v \tag{8}$$

$$v = \frac{v_{max}}{2nTT_1}t^2 \tag{11}$$

$$v = \frac{v_{max}}{nT}(t - T_1) + \frac{v_{max}T_1}{2nT} \tag{12}$$

$$v = -\frac{v_{max}}{2nTT_1}(t - nT - T_1)^2 + v_{max} \tag{13}$$

$$v = v_{max} \tag{14}$$

$$v = -\frac{v_{max}}{2nTT_1}(t - t_t + nT + T_1)^2 + v_{max} \tag{15}$$

$$v = -\frac{v_{max}}{nT}(t - t_t + T_1) + \frac{v_{max}T_1}{2nT} \tag{16}$$

$$v = \frac{v_{max}}{2nTT_1}(t - t_t)^2 \tag{17}$$

where $x_1$: an x-direction position [m] of the cargo start position,
$x_2$: an x-direction position [m] of the cargo target position,
$y_1$: a y-direction position [m] of the cargo start position,
$y_2$: a y-direction position [m] of the cargo target position,
θ: a turning angle [°] of the crane arm,
v: a speed [m/s] of the arm distal end portion,
$v_{max}$: a maximum speed [m/s] of the arm distal end portion,
t: a time [s] from start of turning, $T_1$: a start-up time [s], n: a constant (natural number), T: a swing cycle [s], and t: a suspended cargo conveyance time [s].

4. The cargo crane according to claim 3, wherein the control device is configured to control the luffing angle and the arm length under a condition satisfying a formula (19):

[Math. 7]

$$-L\frac{d\varphi}{dt}\sin\varphi + \frac{dL}{dt}\cos\varphi = \frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\frac{d\theta}{dt} \tag{19}$$

where q: a luffing angle [°],

L: an arm length [m], $x_1$: an x-direction position [m] of the cargo start position, $x_2$: an x-direction position [m] of the cargo target position, $y_1$: a y-direction position [m] of the cargo start position, $y_2$: a y-direction position [m] of the cargo target position, θ: a turning angle [°] of the crane arm, and t: a time [s] from start of turning.

5. The cargo crane according to claim 4, wherein the control device is configured to control the luffing angle and the arm length under a condition satisfying a formula (21) and a formula (22):

[Math. 14]

$$\frac{dL}{dt} = \frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\cos\varphi\frac{d\theta}{dt} \tag{21}$$

$$\frac{d\varphi}{dt} = -\frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\frac{\sin\varphi}{L}\frac{d\theta}{dt} \tag{22}$$

where q: a luffing angle [°],

L: an arm length [m], $x_1$: an x-direction position [m] of the cargo start position, $x_2$: an x-direction position [m] of the cargo target position, $y_1$: a y-direction position [m] of the cargo start position, $y_2$: a y-direction position [m] of the cargo target position, θ: a turning angle [°] of the crane arm, and t: a time [s] from start of turning.

6. The cargo crane according to claim 3, wherein the control device is configured to control the luffing angle and the arm length under a condition satisfying a formula (21) and a formula (22):

[Math. 11]

$$\frac{dL}{dt} = \frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\cos\varphi\frac{d\theta}{dt} \tag{21}$$

-continued $$\frac{d\varphi}{dt} = -\frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\frac{\sin\varphi}{L}\frac{d\theta}{dt} \tag{22}$$

where q: a luffing angle [°],

L: an arm length [m], $x_1$: an x-direction position [m] of the cargo start position, $x_2$: an x-direction position [m] of the cargo target position, $y_1$: a y-direction position [m] of the cargo start position, $y_2$: a y-direction position [m] of the cargo target position, θ: a turning angle [°] of the crane arm, and t: a time [s] from start of turning.

7. The cargo crane according to claim 2, wherein the control device is configured to control the luffing angle and the arm length under a condition satisfying a formula (19):

[Math. 5]

$$-L\frac{d\varphi}{dt}\sin\varphi + \frac{dL}{dt}\cos\varphi = \frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\frac{d\theta}{dt} \tag{19}$$

where q: a luffing angle [°],

L: an arm length [m], $x_1$: an x-direction position [m] of the cargo start position, $x_2$: an x-direction position [m] of the cargo target position, $y_1$: a y-direction position [m] of the cargo start position, $y_2$: a y-direction position [m] of the cargo target position, θ: a turning angle [°] of the crane arm, and t: a time [s] from start of turning.

8. The cargo crane according to claim 7, wherein the control device is configured to control the luffing angle and the arm length under a condition satisfying a formula (21) and a formula (22):

[Math. 12]

$$\frac{dL}{dt} = \frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\cos\varphi\frac{d\theta}{dt} \tag{21}$$

$$\frac{d\varphi}{dt} = -\frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\frac{\sin\varphi}{L}\frac{d\theta}{dt} \tag{22}$$

where q: a luffing angle [°],

L: an arm length [m], $x_1$: an x-direction position [m] of the cargo start position, $x_2$: an x-direction position [m] of the cargo target position, $y_1$: a y-direction position [m] of the cargo start position, $y_2$: a y-direction position [m] of the cargo target position, θ: a turning angle [°] of the crane arm, and t: a time [s] from start of turning.

9. The cargo crane according to claim 2, wherein the control device is configured to control the luffing angle and the arm length under a condition satisfying a formula (21) and a formula (22):

[Math. 8]

$$\frac{dL}{dt}=\frac{-y_1+\frac{y_2-y_1}{x_2-x_1}x_1}{\left(\sin\theta-\frac{y_2-y_1}{x_2-x_1}\cos\theta\right)^2}\left(\cos\theta+\frac{y_2-y_1}{x_2-x_1}\sin\theta\right)\cos\varphi\frac{d\theta}{dt} \tag{21}$$

$$\frac{d\varphi}{dt}=-\frac{-y_1+\frac{y_2-y_1}{x_2-x_1}x_1}{\left(\sin\theta-\frac{y_2-y_1}{x_2-x_1}\cos\theta\right)^2}\left(\cos\theta+\frac{y_2-y_1}{x_2-x_1}\sin\theta\right)\frac{\sin\varphi}{L}\frac{d\theta}{dt} \tag{22}$$

where
q: a luffing angle [°],
L: an arm length [m],
$x_1$: an x-direction position [m] of the cargo start position,
$x_2$: an x-direction position [m] of the cargo target position,
$y_1$: a y-direction position [m] of the cargo start position,
$y_2$: a y-direction position [m] of the cargo target position,
θ: a turning angle [°] of the crane arm, and
t: a time [s] from start of turning.

10. The cargo crane according to claim 1, wherein the control device is configured to:
calculate the turning angle from a formula (8) by using a speed of the arm distal end portion calculated from each of formulas (11) to (17); and
when calculating the speed, use the formula (11) at a time when $t<T_1$, use the formula (12) at a time when $T_1\le t<nT$, use the formula (13) at a time when $nT\le t<nT+T_1$, use the formula (14) at a time when $nT+T_1\le t<t_t-nT-T_1$, use the formula (15) at a time when $t_t-nT-T_1\le t<t_t-nT$, use the formula (16) at a time when $t_t-nT\le t<-T_1$, and use the formula (17) at a time when $t_t-T_1\le t\le t_t$:

[Math. 1]

$$\frac{d\theta}{dt}=\frac{\left(\sin\theta-\frac{y_2-y_1}{x_2-x_1}\cos\theta\right)^2}{\left(-y_1+\frac{y_2-y_1}{x_2-x_1}x_1\right)\sqrt{1+\left(\frac{y_2-y_1}{x_2-x_1}\right)^2}}v \tag{8}$$

$$v=\frac{v_{max}}{2nTT_1}t^2 \tag{11}$$

$$v=\frac{v_{max}}{nT}(t-T_1)+\frac{v_{max}T_1}{2nT} \tag{12}$$

$$v=-\frac{v_{max}}{2nTT_1}(t-nT-T_1)^2+v_{max} \tag{13}$$

$$v=v_{max} \tag{14}$$

$$v=-\frac{v_{max}}{2nTT_1}(t-t_t+nT+T_1)^2+v_{max} \tag{15}$$

$$v=-\frac{v_{max}}{nT}(t-t_t+T_1)+\frac{v_{max}T_1}{2nT} \tag{16}$$

$$v=\frac{v_{max}}{2nTT_1}(t-t_t)^2 \tag{17}$$

where
$x_1$: an x-direction position [m] of the cargo start position,
$x_2$: an x-direction position [m] of the cargo target position,
$y_1$: a y-direction position [m] of the cargo start position,
$y_2$: a y-direction position [m] of the cargo target position,
θ: a turning angle [°] of the crane arm,
v: a speed [m/s] of the arm distal end portion,
$v_{max}$: a maximum speed [m/s] of the arm distal end portion,
t: a time [s] from start of turning,
$T_1$: a start-up time [s],
n: a constant (natural number),
T: a swing cycle [s], and
$t_t$: a suspended cargo conveyance time [s].

11. The cargo crane according to claim 10, wherein the control device is configured to control the luffing angle and the arm length under a condition satisfying a formula (19):

[Math. 6]

$$-L\frac{d\varphi}{dt}\sin\varphi+\frac{dL}{dt}\cos\varphi=\frac{-y_1+\frac{y_2-y_1}{x_2-x_1}x_1}{\left(\sin\theta-\frac{y_2-y_1}{x_2-x_1}\cos\theta\right)^2}\left(\cos\theta+\frac{y_2-y_1}{x_2-x_1}\sin\theta\right)\frac{d\theta}{dt} \tag{19}$$

where
q: a luffing angle [°],
L: an arm length [m],
$x_1$: an x-direction position [m] of the cargo start position,
$x_2$: an x-direction position [m] of the cargo target position,
$y_1$: a y-direction position [m] of the cargo start position,
$y_2$: a y-direction position [m] of the cargo target position,
θ: a turning angle [°] of the crane arm, and
t: a time [s] from start of turning.

12. The cargo crane according to claim 11, wherein the control device is configured to control the luffing angle and the arm length under a condition satisfying a formula (21) and a formula (22):

[Math. 13]

$$\frac{dL}{dt}=\frac{-y_1+\frac{y_2-y_1}{x_2-x_1}x_1}{\left(\sin\theta-\frac{y_2-y_1}{x_2-x_1}\cos\theta\right)^2}\left(\cos\theta+\frac{y_2-y_1}{x_2-x_1}\sin\theta\right)\cos\varphi\frac{d\theta}{dt} \tag{21}$$

$$\frac{d\varphi}{dt}=-\frac{-y_1+\frac{y_2-y_1}{x_2-x_1}x_1}{\left(\sin\theta-\frac{y_2-y_1}{x_2-x_1}\cos\theta\right)^2}\left(\cos\theta+\frac{y_2-y_1}{x_2-x_1}\sin\theta\right)\frac{\sin\varphi}{L}\frac{d\theta}{dt} \tag{22}$$

where
q: a luffing angle [°],
L: an arm length [m],
$x_1$: an x-direction position [m] of the cargo start position,
$x_2$: an x-direction position [m] of the cargo target position,
$y_1$: a y-direction position [m] of the cargo start position,
$y_2$: a y-direction position [m] of the cargo target position,
θ: a turning angle [°] of the crane arm, and
t: a time [s] from start of turning.

13. The cargo crane according to claim 10, wherein the control device is configured to control the luffing angle and the arm length under a condition satisfying a formula (21) and a formula (22):

[Math. 9]

$$\frac{dL}{dt}=\frac{-y_1+\frac{y_2-y_1}{x_2-x_1}x_1}{\left(\sin\theta-\frac{y_2-y_1}{x_2-x_1}\cos\theta\right)^2}\left(\cos\theta+\frac{y_2-y_1}{x_2-x_1}\sin\theta\right)\cos\varphi\frac{d\theta}{dt} \tag{21}$$

-continued $$\frac{d\varphi}{dt} = -\frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\frac{\sin\varphi}{L}\frac{d\theta}{dt} \quad (22)$$

where
q: a luffing angle [°],
L: an arm length [m],
$x_1$: an x-direction position [m] of the cargo start position,
$x_2$: an x-direction position [m] of the cargo target position,
$y_1$: a y-direction position [m] of the cargo start position,
$y_2$: a y-direction position [m] of the cargo target position,
θ: a turning angle [°] of the crane arm, and
t: a time [s] from start of turning.

14. The cargo crane according to claim 1, wherein the control device is configured to control the luffing angle and the arm length under a condition satisfying a formula (19):

[Math. 2]

$$-L\frac{d\varphi}{dt}\sin\varphi + \frac{dL}{dt}\cos\varphi = \frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\frac{d\theta}{dt} \quad (19)$$

where
φ: a luffing angle [°],
L: an arm length [m],
$x_1$: an x-direction position [m] of the cargo start position,
$x_2$: an x-direction position [m] of the cargo target position,
$y_1$: a y-direction position [m] of the cargo start position,
$y_2$: a y-direction position [m] of the cargo target position,
θ: a turning angle [°] of the crane arm, and
t: a time [s] from start of turning.

15. The cargo crane according to claim 4, wherein the control device is configured to control the luffing angle and the arm length under a condition satisfying a formula (21) and a formula (22):

[Math. 10]

$$\frac{dL}{dt} = \frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\cos\varphi\frac{d\theta}{dt} \quad (21)$$

$$\frac{d\varphi}{dt} = -\frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\frac{\sin\varphi}{L}\frac{d\theta}{dt} \quad (22)$$

where
q: a luffing angle [°],
L: an arm length [m],
$x_1$: an x-direction position [m] of the cargo start position,
$x_2$: an x-direction position [m] of the cargo target position,
$y_1$: a y-direction position [m] of the cargo start position,
$y_2$: a y-direction position [m] of the cargo target position,
θ: a turning angle [°] of the crane arm, and
t: a time [s] from start of turning.

16. The cargo crane according to claim 1, wherein the control device is configured to control the luffing angle and the arm length under a condition satisfying a formula (21) and a formula (22):

[Math. 3]

$$\frac{dL}{dt} = \frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\cos\varphi\frac{d\theta}{dt} \quad (21)$$

$$\frac{d\varphi}{dt} = -\frac{-y_1 + \frac{y_2 - y_1}{x_2 - x_1}x_1}{\left(\sin\theta - \frac{y_2 - y_1}{x_2 - x_1}\cos\theta\right)^2}\left(\cos\theta + \frac{y_2 - y_1}{x_2 - x_1}\sin\theta\right)\frac{\sin\varphi}{L}\frac{d\theta}{dt} \quad (22)$$

where
φ: a luffing angle [°],
L: an arm length [m],
$x_1$: an x-direction position [m] of the cargo start position,
$x_2$: an x-direction position [m] of the cargo target position,
$y_1$: a y-direction position [m] of the cargo start position,
$y_2$: a y-direction position [m] of the cargo target position,
θ: a turning angle [°] of the crane arm, and
t: a time [s] from start of turning.

17. A method for preventing a swing of a cargo crane configured to convey a suspended cargo from an arbitrary cargo start position to a cargo target position by a turning motion of a crane arm, the suspended cargo being suspended by a wire provided to an arm distal end portion of the crane arm, the method for preventing the swing of the cargo crane comprising:

using, as the cargo crane, a cargo crane including an arm turning mechanism configured to turn the crane arm, an arm luffing mechanism configured to adjust a luffing angle of the crane arm, and an arm extension and contraction mechanism configured to adjust an arm length of the crane arm;

calculating a trajectory in which the suspended cargo is conveyed, to be a straight line trajectory as viewed from at least a vertical direction, according to the cargo start position and the cargo target position;

calculating a turning angle of the crane arm, the luffing angle, and the arm length to cause the trajectory to be the straight line trajectory by using the cargo start position, the cargo target position, a maximum speed, a suspended cargo swing cycle, and a start-up time; and controlling the arm turning mechanism, the arm luffing mechanism, and the arm extension and contraction mechanism to achieve the turning angle, the luffing angle, and the arm length calculated.

18. The method for preventing a swing of a cargo crane accordingly to claim 17, further comprising:

performing a calculation to cause a height of the straight line trajectory in the vertical direction to be constant.

19. The method for preventing a swing of a cargo crane accordingly to claim 17, further comprising:

calculating the turning angle from a formula (8) by using a speed of the arm distal end portion calculated from each of formulas (11) to (17); and when calculating the speed, using the formula (11) at a time when $t<T_1$, using the formula (12) at a time when $T_1 \le t < nT$, using the formula (13) at a time when $nT \le t < nT+T_1$, use the formula (14) at a time when $nT+T_1 \le t < t_r - nT - T_1$, using the formula (15) at a time when $t_r - nT - T_1 \le t < t_r - nT$, using the formula (16) at a time when $t_r - nT \le t < t_r - T_1$, and using the formula (17) at a time when $t_r - T_1 \le t \le t_r$:

[Math. 1]

$$\frac{d\theta}{dt} = \frac{\left(\sin\theta - \frac{y_2 - y_1}{x_2 - x_1}\cos\theta\right)^2}{\left(-y_1 + \frac{y_2 - y_1}{x_2 - x_1}x_1\right)\sqrt{1 + \left(\frac{y_2 - y_1}{x_2 - x_1}\right)^2}} v \quad (8)$$

$$v = \frac{v_{max}}{2nTT_1}t^2 \quad (11)$$

$$v = \frac{v_{max}}{nT}(t - T_1) + \frac{v_{max}T_1}{2nT} \quad (12)$$

$$v = -\frac{v_{max}}{2nTT_1}(t - nT - T_1)^2 + v_{max} \quad (13)$$

$$v = v_{max} \quad (14)$$

$$v = -\frac{v_{max}}{2nTT_1}(t - t_t + nT + T_1)^2 + v_{max} \quad (15)$$

$$v = -\frac{v_{max}}{nT}(t - t_t + T_1) + \frac{v_{max}T_1}{2nT} \quad (16)$$

-continued $$v = \frac{v_{max}}{2nTT_1}(t - t_t)^2 \quad (17)$$

where $x_1$: an x-direction position [m] of the cargo start position, $x_2$: an x-direction position [m] of the cargo target position, $y_1$: a y-direction position [m] of the cargo start position, $y_2$: a y-direction position [m] of the cargo target position, θ: a turning angle of the crane arm, v: a speed [m/s] of the arm distal end portion, $v_{max}$: a maximum speed [m/s] of the arm distal end portion, t: a time [s] from start of turning, $T_1$: a start-up time [s], n: a constant (natural number), T: a swing cycle [s], and t: a suspended cargo conveyance time [s].

* * * * *